United States Patent
Bunce

[15] 3,699,930
[45] Oct. 24, 1972

[54] ROTARY INTERNAL COMBUSTION ENGINE

[72] Inventor: Earl G. Bunce, 414F Chateau Drive S.W., Huntsville, Ala. 35801

[22] Filed: Nov. 8, 1971

[21] Appl. No.: 196,397

[52] U.S. Cl. ................... 123/8.41, 418/10, 418/196, 418/183
[51] Int. Cl. .............................................. F02b 53/08
[58] Field of Search .......... 123/8.07, 8.05, 8.09, 8.17, 123/8.23, 8.31, 8.41, 8.43; 418/11, 212, 221, 243, 196

[56] References Cited

UNITED STATES PATENTS

| 3,550,565 | 12/1970 | Sanchez | 418/196 X |
| 2,927,560 | 3/1960 | Breele | 418/196 X |
| 3,640,252 | 4/1970 | Spinnett | 418/196 X |

FOREIGN PATENTS OR APPLICATIONS

| 436,196 | 6/1948 | Italy | 418/196 |

Primary Examiner—William L. Freeh
Assistant Examiner—A. G. Goedde
Attorney—C. A. Phillips

[57] ABSTRACT

A rotary internal combustion engine having separately housed compression and power rotors and wherein there is a pair of sealing rotors positioned adjacent diametrically opposite peripheral edges of each rotor to form two sealed pressure chambers in each housing.

5 Claims, 1 Drawing Figure

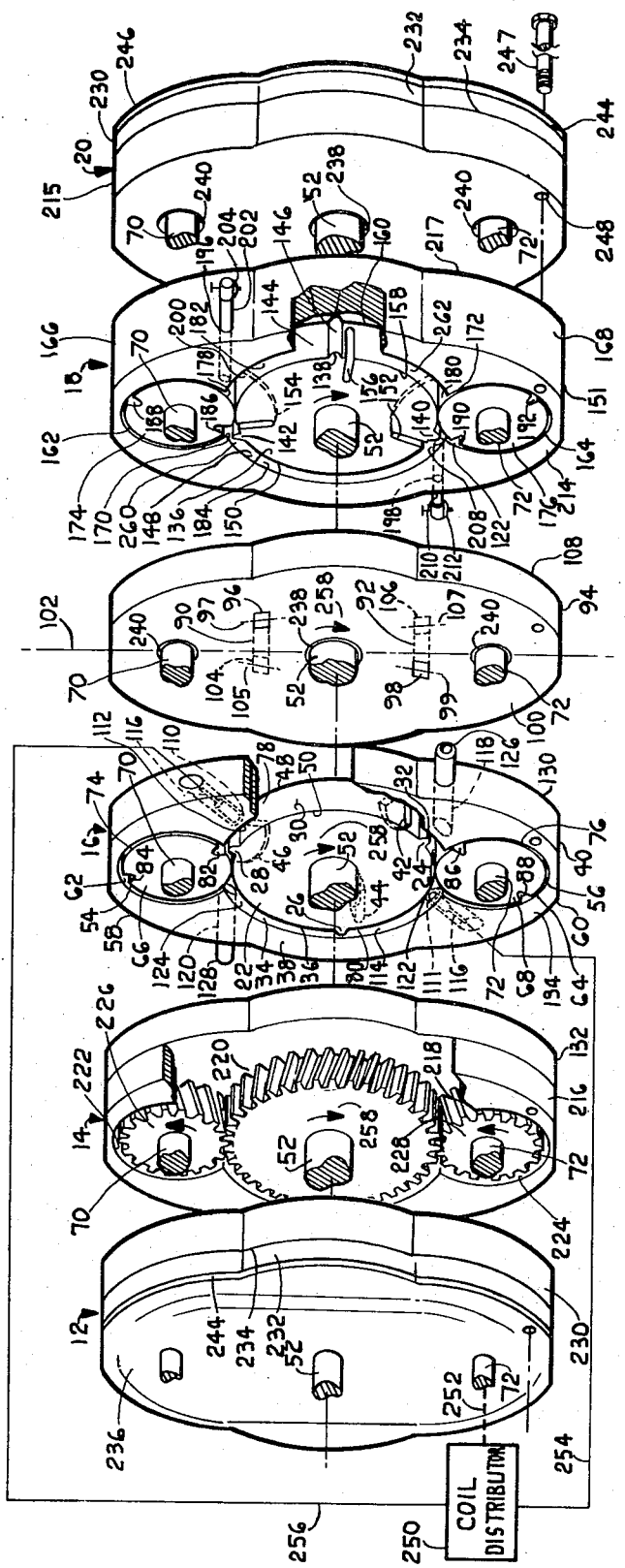

ROTARY INTERNAL COMBUSTION ENGINE

BACKGROUND OF THE INVENTION

1. Field of the Invention

This invention relates to rotary engines and more particularly to a rotary engine having a power rotor and separate compressor rotor.

2. Description of the Prior Art

One problem encountered in the construction of rotary engines has been that of undesirable leakage around power rotors and sealing rotors during compression or firing modes of operation. When parts are made with sufficient clearances to rotate freely some leakage is inevitable. This leakage of course lowers the efficiency of a rotary engine. Another problem occurs when a single power rotor is used to compress the fuel mixture and also provide a firing chamber. For example, this limits the number of firings per each revolution of the rotor.

SUMMARY OF THE INVENTION

It is an object of this invention to provide an improved rotary engine wherein the compression function of the engine and firing function of the engine are separated.

These and other objects, features and advantages are accomplished in the present invention which encompasses a rotary engine having distinct but like configured rotary compressor and power assemblies. Each of these assemblies includes a pair of notched sealing rotors on opposite sides of a central rotor having peripheral lugs which perform the piston function. Two functional chambers are formed by this configuration, on either side of the main rotor and its housing with the division between chambers being effected by a sealing contact between the sealing rotors and the main rotor. The main rotor and sealing rotors are coupled together through appropriate shafts and gears to enable synchronization of the peripheral speeds of the main and sealing rotors and to time rotation so that the peripheral lugs on the main rotor mesh with slots in the sealing rotors. Gases are contained between adjacent main rotary lugs and thus there is created a compression or power stroke for the six times per revolution, there being three such actions in each of the two chambers of each assembly per revolution. A gas mixture is applied to each side of each chamber of the compression assembly adjacent the sealing rotor which is nearest the commencement of the suction stroke of the assembly and the compressed gases are fed by output channels oppositely positioned with respect to the sealing rotors to similarly positioned cross coupled inlets in the two chambers of the power assembly. Exhaust ports are coupled to the two chambers of the power assembly to exhaust gases from each chamber at the end of a power stroke.

BRIEF DESCRIPTION OF THE DRAWINGS

The FIGURE is a perspective view of an embodiment of the invention partly in section with various assemblies of the invention separated for clarity.

DESCRIPTION OF THE PREFERRED EMBODIMENT

Referring to the drawing there is shown in the FIGURE an embodiment of the invention which is separated into five separate assemblies for purposes of description, and is illustrative of the sectionalized construction. There are two end support assemblies 12 and 20 and three engine function assemblies designated as the timing gear, power and compressor assemblies, 14, 16 and 18, respectively. These assemblies, taken as a group, will hereinafter be designated as rotary engine 10. Power assembly 16 includes annular power rotor 22 having three transverse symmetrically spaced lobes or lugs 24, 26 and 28 formed about outer periphery 30 which are configured similar to gear teeth and have top land surfaces 32 contoured to provide a sealing contact with inner surface 34 of circular cylindrical cavity 36, formed within the central annular portion 38 of housing 40.

Inlet slots 42, 44 and 46, centrally positioned 10° counterclockwise with respect to lobes 24, 26 and 28, respectively, are milled into the outer periphery 30 of rotor 22, using a circular milling cutter of sufficient width and diameter to form a circular quarter section as shown. Inlet slots 42, 44 and 46 extend transversely from edge 48 and substantially to edge 50 of rotor 22 which is secured to main shaft 52. Cylindrical cavities 54 and 46, formed in upper portion 58 and lower portion 60 of housing 40 open into central cavity 36 and have inner circumferences 62 and 64 tangent to outer periphery 30 of rotor 22. Annular upper and lower sealing rotors 66 and 68 respectively, dimensioned to closely and rotatably fit cavities 54 and 56, respectively, are rigidly secured to upper and lower sealing rotor shafts 70 and 72, respectively. Rotors 66 and 68 include outer peripheries 74 and 76 which are in sealing contact with power rotor 22, thus preventing communication between two firing chambers 78 and 80 within housing 40.

Diametrically opposed notches 82 and 84 cut into periphery 74 of rotor 66 and like placed notches 86 and 88 cut into periphery 76 of lower rotor 68 are configured to mesh with lobes 24, 26 and 28 of rotor 22.

There are two diametrically opposed inlet ports 90 and 92 formed in spacer plate 94 having openings 96 and 98 on side 100 of plate 94. These ports, 90 and 92, are dimensioned and oriented to communicate with slots 42, 44 and 46 of rotor 22. Openings 96 and 98 are between 10° and 20° in width and are centered about points 97 and 99, respectively, which are at a peripheral angle of 10° to 30° from vertical center line 102. Openings 96 and 98 are positioned inward with respect to outer periphery 30 of rotor 22 so that they are open only when in alignment with inlet slots 42, 44 and 46 of rotor 22. Inlet ports 90 and 92 extend angularly through spacer plate 94 and have like positioned openings 104 and 106 on compressor side 108 of plate 94. Openings 104 and 106 are between 10° and 20° in width and are centered about points 105 and 107, respectively, which are at a peripheral angle of 10° to 30° from vertical center line 102.

Threaded aperture 100 and a like aperture, 111, extend into end area 112 and 114 of firing chambers 78 and 80, respectively, and are adapted to accept spark plugs 116. Power rotor housing 40 may also be drilled and tapped for fuel injection by means not shown. Exhaust ports 118 and 120 are provided in opposite ends 122 and 124 of firing chambers 78 and 80, respectively, and extend outwardly through housing section 40, where they are fitted to exhaust manifolds 126 and 128 respectively. Spacer plate 94, when assembled, provides a gas tight seal for side 130 of housing section 40. Spacer plate 132 provides a similar seal for side 134 of housing 40 when assembled.

Compressor assembly 18 includes annular compression rotor 136 having approximately twice the width dimension of power rotor 22, but of like diameter and includes three transverse symmetrically spaced lobes 138, 140 and 142 formed about outer periphery 144. Lobes 138, 140 and 142 are configured similar to gear teeth having top land surfaces 146 contoured to provide a sealing contact with inner surface 148 of circular cylindrical cavity 150 formed in central annular portion of housing 151. Transverse fuel outlet slots 152, 154 and 156 are milled into outer periphery 144 of rotor 136 using a circular milling cutter of sufficient width and diameter to form a circular quarter sector as shown. Slots 152, 154 and 156 are centrally positioned approximately 10° clockwise with respect to lobes 138, 140 and 142, respectively, and extend from edge 148 and substantially to edge 160. Compression rotor 136 is secured to main shaft 52 such that outlet slots 152, 154 and 156 are positioned 40 degrees counterclockwise with respect to inlet slots 42, 44 and 46 of power rotor 22.

Cylindrical cavities 162 and 164 formed in upper and lower portions 166 and 168 respectively of housing 151 open into central cylindrical cavity 150 and have inner circumferences 170 and 172 tangent to outer periphery 144 of rotor 136. Annular upper and lower sealing rotors 174 and 176 are dimensioned to closely and rotatably fit areas 162 and 164, respectively, and have outer peripheries 178 and 180 in sealing contact with rotor 136 in order to prevent communication between compression chambers 182 and 184. Diametrically opposed transverse notches 186 and 188 cut in outer periphery 178 of upper sealing rotor 174 are configured to mesh with lobes 138, 140 and 142 of rotor 136 when sealing rotor 174 is secured to upper shaft 70. Notches 186 and 188 are positioned 60° clockwise with respect to notches 82 and 84, respectively, in upper sealing rotor 66 of power assembly 16. Like configured notches 190 and 192 are cut in outer periphery 180 of lower sealing rotor 176 which mesh with lobes 138, 140 and 142 on compression rotor 136 when sealing rotor 176 is secured to lower shaft 72, with notches 190 and 192 positioned 60° clockwise with respect to notches 86 and 88, respectively, in lower sealing rotor 68 of power assembly 16.

Fuel intake ports 196 and 198 are formed in upper and lower portions 166 and 168, respectively, of housing section 151. Upper intake port 196 extends into end region 200 of compression chamber 182 and is adapted to accept intake manifold 202 fitted with carburetor 204. Lower intake port 198 extends into end region 208 of compression chamber 184 and is adapted to accept intake manifold 210 fitted with a second carburetor 212, or as previously mentioned, housing 151 may be configured to accept fuel injector assembly, not shown. Spacer plate 94 provides a gas tight seal for side 214 of housing 151 when engine 10 is assembled. Also, as previously mentioned, openings 104 and 106 of inlet ports 90 and 92 are dimensioned and oriented to communicate with outlet slots 152, 154 and 156 of rotor 136 at points 105 and 107 at peripheral angle of 10 to 30 degrees from central vertical plane 102. Openings 104 and 106 are so positioned with respect to periphery 144 of rotor 136 that fuel transfer is enabled only when they are in alignment with slots 152, 154 or 156. Spacer plate 215 provides a gas tight seal for side 217 of compressor housing 151 when assembled.

Timing assembly 14 includes housing member 216 having central annular opening 218 adapted to enclose main timing gear 220 which is secured to main shaft 52. Annular upper and lower openings 222 and 224, respectively, which interconnect with central annular opening 218, are adapted to accept upper and lower timing gears 226 and 228, respectively, which are secured to upper and lower sealing rotor shafts 70 and 72, respectively. The upper and lower timing gears 226 and 228 are in turn engaged with centrally located timing gear 220, such that notches 82 and 84 of upper sealing rotor 66 and notches 86 and 88 of lower sealing rotor 68 mesh with lobes 24, 26 and 28 of power rotor 22. The gear ratio between timing gear 220 and upper and lower gears 226 and 228 is such that for every two revolutions of timing gear 220, sealing rotor shaft drive gears 226 and 228 complete three revolutions. This relationship is important since it assures that when rotor 22 or 136 rotate 120°, which is the spacing between associated lobes, the sealing rotor involved has rotated 180°, so that lobes of each rotor 22 or 136 mesh with notches in sealing rotors 66 and 68 or 174 and 176, respectively, for each 120° of rotation.

End support assemblies 12 and 20 are shown as assembled and each includes ball bearing support plate 230, retainer plate 232, and cover plate 244. Each end support plate 230 is equipped with ball bearings, not shown, which are adapted to journal upper and lower sealing rotor shafts 70 and 72 and main shaft 52. Each bearing retainer plate 232 when assembled to side 234 of bearing support plate 230 is adapted to prevent axial shift of main shaft 52, and sealing rotor shafts 70 and 72 toward end 236 or 246 of engine 10. End cover plate 244 is assembled to bearing retainer plate 232 and prevents internal lubricant or gases from escaping rotary engine 10. Intermediate main shaft support bearings 238 and sealing rotor shaft support bearings 240 installed in spacer plates 94 and 215 are of conventional materials and are adapted to closely fit main shaft 52 and sealing rotor shafts 70 and 72, respectively. Bearings 238 and 240 in spacer plate 94 provide a gas tight seal between power assembly 16 and compressor assembly 18. Bearings 238 and 240 of spacer plate 215 provide a seal between compressor assembly 18 and end assembly 20. Like bearings, not shown, in spacer plate 132 prevent leakage into timing assembly 14 from power assembly 16. When separate assemblies 12, 14, 16, 18 and 20 are mated together, they are typically maintained in a gas tight relationship by a plurality of bolts 247 which extend through in-line holes 248 provided in each assembly. Conventional coil-distributor assembly 250, mechanically coupled to lower sealing rotor shaft 72, by means not shown, but represented by line 252, provides timed electrical impulses through spark plug wires 254 and 256 for fuel ignition.

In operation, rotary engine 10 actually produces six power impulses for each revolution of main engine shaft 52. For purposes of explanation, only one of these events will be initially described. The normal direction of rotation of main shaft 52 is clockwise as indicated by arrow 258. Each sealing rotor shaft 70 and 72 thus rotates counterclockwise as determined by timing gears 226 and 228. With reference to compressor assembly 18, assume that lobe 140 on compression rotor 136 has just passed lower sealing rotor 176. As lobe 140 sweeps clockwise across lower intake port 198, fuel from carburetor 212 is drawn into compression chamber 184. As lobe 140 approaches upper sealing rotor 174, compression chamber 184 is charged with fuel. The following lobe 138 passes lower rotor 176 and sweeps through compression chamber 184, which has just been charged with fuel, thus compressing it in upper end region 260 of compression chamber 184. As outlet slot 156 of rotor 136 transverses opening 104 of inlet port 90, fuel, under pressure, is supplied to firing chamber 78 of power assembly 16.

Fuel flows through inlet port 90 and inlet slot 42 of power rotor 22 which has now rotated to an aligned position with respect to opening 96 of inlet port 90. As rotation continues, slot 42 of power rotor 22 passes beyond opening 96. This action closes inlet port 90, after which a timed electrical impulse from coil distributor assembly 250 through wire 256 fires spark plug 116 and expanding fuel applies pressure between upper sealing rotor 66 and lobe 24 of power rotor 22 turning rotor 22 in a clockwise direction. As lobe 24 sweeps through firing chamber 78 it scavenges unburned gases from firing chamber 78 left there from a previous firing. Since compression chamber 182 is identical to chamber 184 when a lobe 138, 140 or 142 passes upper sealing rotor 174, fuel is drawn into chamber 182, as it was into opposite chamber 184, through intake manifold 202. During this same time, fuel is being compressed in lower region 262 of compression chamber 182. As one of slots 152, 154 or 156 reaches an aligned position with respect to opening 106 within compression chamber 182, fuel under pressure passes through a second inlet port 92 in like manner as described above, to a second firing chamber 80 of power assembly 16, which is identical to firing chamber 78, and thus a second power impulse is generated in firing chamber 80. There being three lobes 138, 140 and 142 sweeping through each of two compression chambers 182 and 184 during any one revolution of rotor 136, six intake compression events occur for each such revolution of rotor 136. Also, since at the end of each compression cycle fuel is transferred to one of two firing chambers 78 or 80 in power assembly 16, and the relative motions of rotors 136 and 22 are in sychronism, it follows that six power impulses occur during each revolution of power rotor 22, thus imparting smooth power to main shaft 52.

For purposes of identifying references between the claims and specifications, rotor 174 is referred to as first sealing rotor,
rotor 176 is referred to as second sealing rotor,
rotor 66 is referred to as third sealing rotor, and
rotor 68 is referred to as fourth sealing rotor.
Rotor 136 is referred to as compression rotor and rotor 22 is referred to as power rotor.

The region between rotor 136 and housing 151 and between rotor 174 and rotor 176 is referred to as first compression chamber 182, and the region between rotor 136 and the other side of housing 151 and between rotor 174 and rotor 176 is referred to as second compression chamber 184.

Similarly the region between housing 40 and rotor 22 and between sealing rotors 66 and 68 is referred to as a first power chamber 78, and the region between power rotor 22 and housing 40 and between sealing rotors 66 and 68 is referred to as a second power chamber 80.

What is claimed is:

1. A rotary internal combustion engine comprising:
    a centrally positioned drive shaft and first and second auxiliary shafts parallel to and spaced from said main drive shaft;
    a compression assembly comprising:
        a first housing including a first central chamber and first and second end chambers in opposite end regions of said first housing and opening into said first central chamber,
        a compression rotor mounted on said main shaft within said first central chamber and including a plurality of equally spaced peripheral lugs making a sealing engagement with wall regions of said central chamber and said compression rotor further including a like plurality of evenly spaced peripheral slots opening to one side and adjacent the forward, with respect to direction of rotation of said compression rotor, edge of each said lug,
        a first sealing rotor mounted on said first auxiliary shaft within said first end chamber and including at least one peripheral slot, a said slot of said first sealing rotor being adapted to mesh with a said lug of said compression rotor,
        a second sealing rotor mounted on said second auxiliary shaft within said second end chamber and including at least one peripheral slot, a said slot of said second sealing rotor being adapted to mesh with a said lug of said compression rotor,
        a first compression chamber formed between first and second sealing rotors and between one side of said first housing and said compression rotor and a second compression chamber formed between first and second sealing rotors and between the opposite side of said first housing and said compression rotor;
    a power impulse assembly comprising:
        a second housing including a second central chamber and third and fourth end chambers located in opposite end regions of said second housing and opening into said central chamber,
        a power impulse rotor mounted on said main shaft within said second central chamber and including a plurality of equally spaced peripheral lugs making a sealing engagement with wall regions of said second central chamber and said power impulse rotor further including a plurality of evenly spaced peripheral slots opening to one side of said power impulse rotor and being located adjacent to the forward, with respect to direction of rotation, edge of each said last named lug, a third sealing rotor mounted on said first auxiliary shaft within said third end chamber and including at least one peripheral slot, a said slot of said third sealing rotor being adapted to mesh with a said lug of said power impulse rotor, a fourth sealing rotor mounted on said second auxiliary shaft within said fourth end chamber and including at least one peripheral slot, a said slot of said fourth sealing rotor being adapted to mesh with a said lug of said power impulse rotor, and a first power chamber formed between said third and fourth sealing rotors and between one side of said second housing and said power impulse rotor and a second power chamber formed between said third and fourth sealing rotors and between the opposite side of said second housing and said power impulse rotor;

timing means for interconnecting said main shaft and said first and second auxiliary shafts at relative speeds whereby the peripheral speed of all said rotors are identical;

fuel source means comprising a first inlet through said first housing into said first compression chamber adjacent said first sealing rotor and a second inlet to said first housing into said second compression chamber adjacent said second sealing rotor;

gas coupling means comprising a first channel extending from a region of said first compression chamber opposite a radial position of said slot in said compression rotor as said compression rotor rotates by said first channel and adjacent said second sealing rotor to a region of said second power chamber adjacent said fourth sealing rotor and a second channel extending from the region of said second compression chamber opposite the radial position of a said slot in said compression rotor as it rotates past said second channel adjacent said first sealing rotor to a region of said first power chamber adjacent said third sealing rotor; and exhaust means comprising a first outlet through said second housing from a region of said first power chamber adjacent said fourth sealing rotor and a second outlet through said second housing from a region of said second power chamber adjacent said third sealing rotor.

2. A rotary internal combustion engine as set forth in claim 1 wherein the width of said central chamber and said compression rotor have a width substantially twice the width of said second central chamber and said power impulse rotor.

3. A rotary internal combustion engine as set forth in claim 2 wherein said compression rotor and said power impulse rotor each include three of said lugs, said lugs of said compression rotor being displaced by 60° with respect to lugs of said power impulse rotor.

4. A rotary internal combustion engine as set forth in claim 3 wherein each of said sealing rotors include two, oppositely positioned, said slots.

5. A rotary internal combustion engine as set forth in claim 3 wherein said first channel of said gas coupling means is between 10° and 20° in width, centered at a peripheral angle of 10° to 40° from said second sealing rotor and a reference line between the point of contact of said first and second sealing rotors and said second channel is between 10° and 20° in width and is centered at a peripheral angle of 10° to 40° from said first sealing rotor and said reference line, and the center of said first channel enters said second power chamber at a peripheral angle of 10° to 40° from said fourth sealing rotor and the center of said second channel enters said first power chamber at a peripheral angle of 10° to 40° from said third sealing rotor.

* * * * *